US008322307B2

(12) United States Patent
Dionne

(10) Patent No.: US 8,322,307 B2
(45) Date of Patent: Dec. 4, 2012

(54) PET GROOMING DEVICE

(76) Inventor: Alicia Dionne, Lake Villa, IL (US)

( * ) Notice: Subject to any disclaimer, the term of this patent is extended or adjusted under 35 U.S.C. 154(b) by 164 days.

(21) Appl. No.: 12/628,496

(22) Filed: Dec. 1, 2009

(65) Prior Publication Data

US 2010/0132625 A1 Jun. 3, 2010

Related U.S. Application Data

(60) Provisional application No. 61/118,856, filed on Dec. 1, 2008.

(51) Int. Cl.
*A01K 13/00* (2006.01)

(52) U.S. Cl. .......................................... 119/625; 119/600

(58) Field of Classification Search ................ 119/600, 119/602, 603, 611, 612, 615, 618, 619, 650, 119/652, 664, 625
See application file for complete search history.

(56) References Cited

U.S. PATENT DOCUMENTS

| | | | | |
|---|---|---|---|---|
| 4,312,598 A * | 1/1982 | Vagner | ................................ | 401/1 |
| 4,995,344 A * | 2/1991 | Olson | ........................... | 119/603 |
| 5,211,131 A * | 5/1993 | Plyler | ............................ | 119/606 |
| 5,261,426 A * | 11/1993 | Kellett et al. | .................. | 132/108 |
| 5,862,563 A * | 1/1999 | Hartmann | ......................... | 15/169 |
| 6,158,442 A * | 12/2000 | Piatetsky | ........................ | 132/115 |
| D444,925 S * | 7/2001 | Monette | ........................ | D30/158 |
| 6,793,434 B1* | 9/2004 | Olson | ............................ | 401/286 |
| 7,225,815 B2* | 6/2007 | Kung | .............................. | 132/119 |
| 7,908,700 B2* | 3/2011 | DiPippo | .......................... | 15/169 |
| 2007/0261643 A1* | 11/2007 | Hurwitz | ......................... | 119/602 |
| 2008/0052850 A1* | 3/2008 | McKay | ............................ | 15/114 |

* cited by examiner

*Primary Examiner* — Rob Swiatek
*Assistant Examiner* — Thien Thanh Pham
(74) *Attorney, Agent, or Firm* — Greer, Burns & Crain, Ltd.

(57) ABSTRACT

A pet grooming device is provided including a brush base with a plurality of bristles and at least one base latch for securing a biased platform. Included with the biased platform is at least one platform latch for securing the biased platform to the brush base by interconnecting the brush base latch with the biased platform latch.

9 Claims, 7 Drawing Sheets

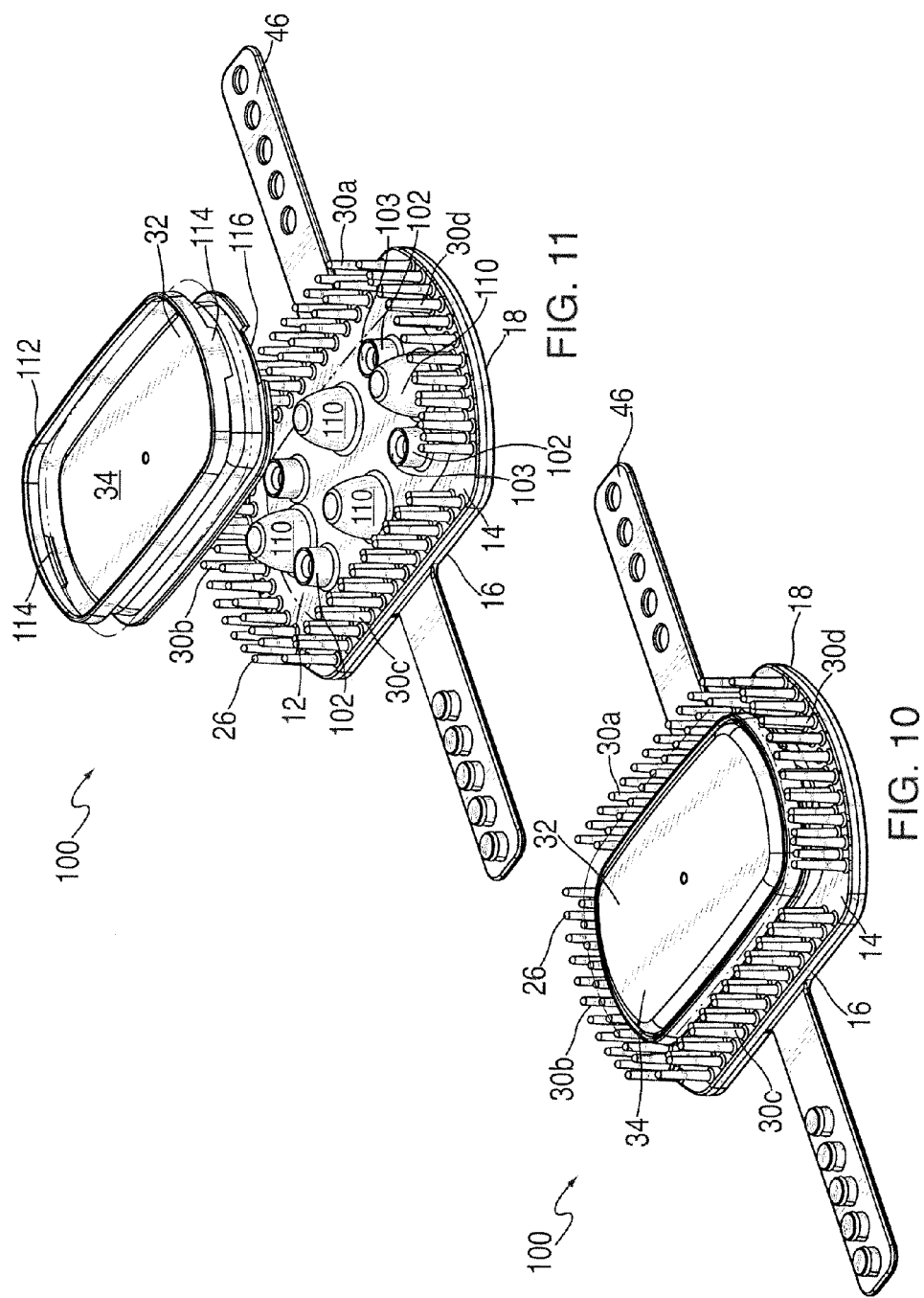

PET GROOMING DEVICE

BACKGROUND OF THE INVENTION

The present invention relates generally to grooming devices for pets, and provides such a device designed to freshen up a pet in between baths or grooming operations. The present device also facilitates the removal of debris, bacteria, allergens, and offensive odor from a pet, in addition to having the ability to add fragrance, moisture, and shine to its coat.

A conventional pet grooming device resembles a conventional hair brush with bristles of uniform length that are located on both upper and lower sides the brush. The product includes a moistened cloth or pad that covers all of the individual bristles. One disadvantage of this device is that the cloth does not make adequate contact with the pet's hair or fur, since the bristles are completely covered by the cloth. As such, the device is unable to separate hairs to wipe them clean. Another disadvantage of the prior pet groomer is that the cloths are difficult to remove when replacement is required, because they tend to bunch together and must be individually removed from each bristle. This process is cumbersome and awkward.

SUMMARY OF THE INVENTION

A pet grooming device is provided that includes a brush base with a perimeter of bristles and a biased platform supporting an attached disposable wipe or pad. Specifically, the present device is designed so that the wipe makes increased contact with the pet's hair or coat for more effective cleansing, bacteria removal, deodorizing, application of fragrance and shining of the fur or coat. Another important feature is that the present grooming device fits comfortably into a user's right or left hand to provide enhanced comfort and control when maneuvering it around the contours of the pet. Additionally, in the present grooming device wipes are easily interchanged based on the desired application.

More specifically, a pet grooming device is provided including a brush base with a plurality of bristles and at least one base latch for securing a biased platform. Included with the biased platform is at least one platform latch for securing the biased platform to the brush base by interconnecting the brush base latch with the biased platform latch.

Also provided is a pet grooming device including a brush base having a first surface, a second surface, a plurality of bristles projecting from the first surface, at least one spring pocket, and at least one base latch for securing a biased platform. The biased platform has an outer surface and an inner surface, at least one platform latch and at least one spring mounted between the platform inner surface and the base first surface, the biased platform being attached to the brush base first surface by interlocking the at least one spring to the at least one spring pocket and interconnecting the at least one brush base latch with the at least one biased platform latch. Also included is a wipe positioned on the biased platform and a ring attached to the biased platform for maintaining the wipe on the biased platform, the wipe being positioned between the ring and the biased platform.

BRIEF DESCRIPTION OF THE DRAWINGS

FIG. 10 is a top perspective view of an additional embodiment of the present pet grooming device;

FIG. 11 is an exploded perspective view of the embodiment of FIG. 10;

DETAILED DESCRIPTION OF THE EMBODIMENT

Figure 1:
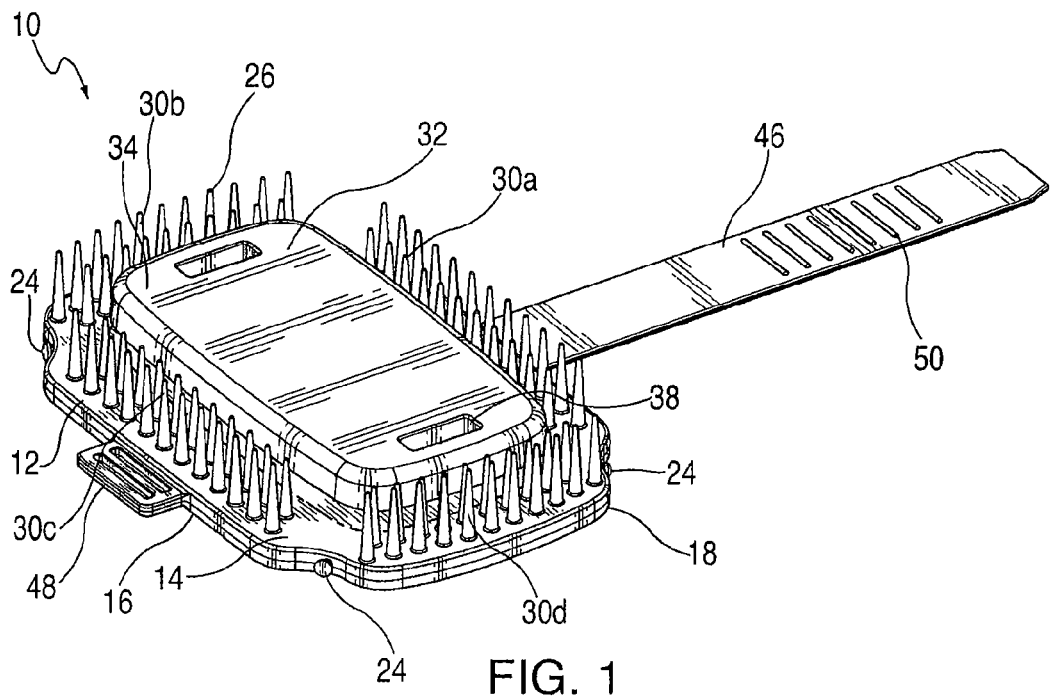
FIG. 1 is a top perspective view of the present pet grooming device.
Figure 2:
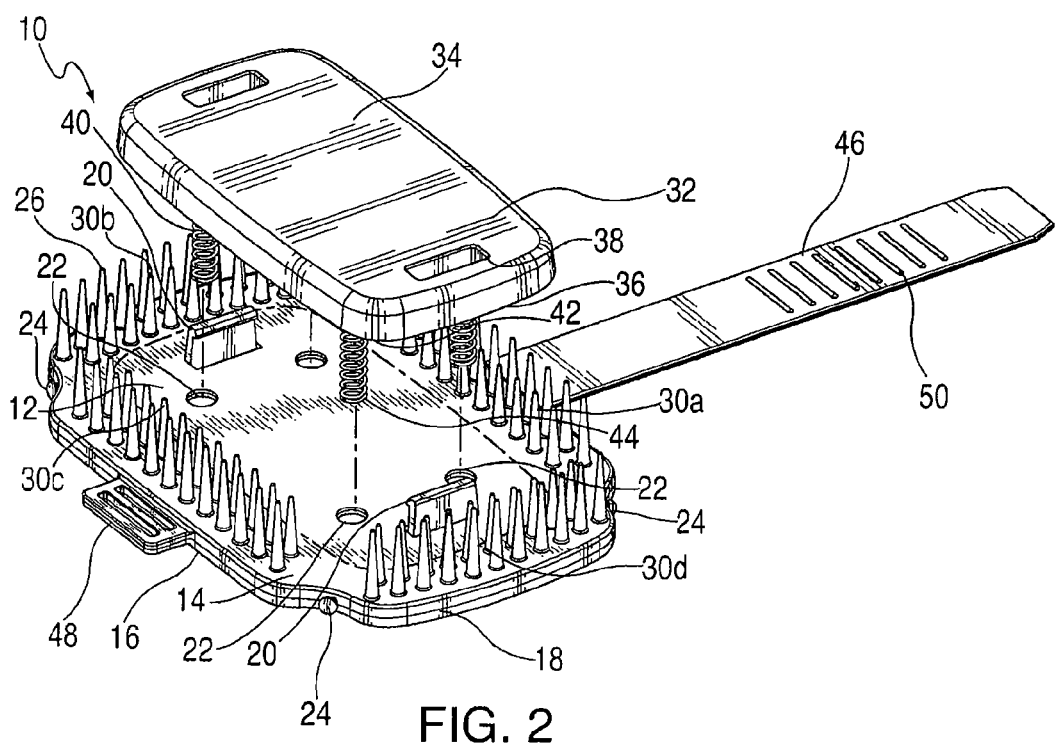
FIG. 2 is an exploded perspective view of the present pet grooming device.

Referring now to FIGS. 1-2, a pet grooming device is generally designated as 10 and includes a brush base 12 having a first, inner surface 14 and a second, outer surface 16 opposite the first surface, and a side or peripheral edge 18. In this embodiment, the brush base 12 is generally rectangular, however, other shapes are considered suitable. Pliable rubber, plastic or other similar material are preferred for the brush base 12, and more specifically, pliable rubber or plastic having a shore hardness of at least 80 durometers especially is preferred.

The brush base 12 includes at least one latch 20, and preferably a pair of such latches 20 that extend generally perpendicularly from the first surface 14. The latches 20 are preferably integral to the brush base 12, for example, by injection molding, attachment by chemical adhesive, or the like, and may vary in number and arrangement based on design preference. Also included in the brush base 12 is at least one and preferably a plurality of generally cylindrical, recessed spring pockets 22. In the present configuration, four spring pockets 22 are included in a generally rectangular orientation. It is contemplated that the spring pockets 22 may vary in number, configuration and arrangement to suit the situation.

Figure 6:
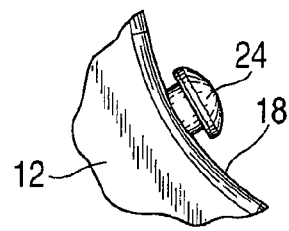
FIG. 6 is a fragmentary top perspective view of a button included on the device.

Referring now to FIGS. 1, 2 and 6, the brush base 12 also includes a plurality of buttons 24. The buttons 24 are preferably located on the side edge 18 and protrude horizontally or radially from the brush base 12. In this configuration, the grooming device 10 includes four buttons 24, each located approximately at an associated corner of the brush base 12. The buttons 24 are generally round, but other button shapes are also contemplated. More specifically, it is preferred that the buttons 24 are a protruding lug shape with a relatively large, dominant head.

Included in the biased platform 32 is at least one, and preferably a pair of platform latches 38. The platform latches 38 may vary in number and arrangement to suit the situation.

As should be appreciated, the number of platform latches 38 should correspond to the number of brush base latches 20. In the preferred embodiment, the platform latch 38 includes a generally rectangular hollow chamber 39, and is configured for matingly receiving and interlocking with the brush base latch 20.

Figure 7:
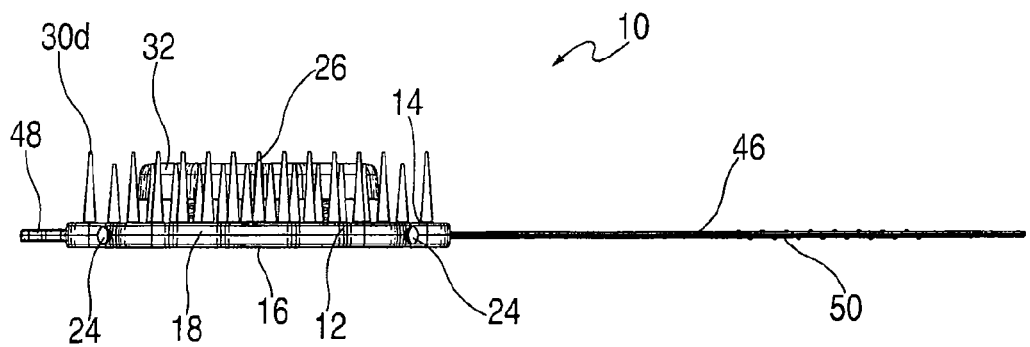
FIG. 7 is a side elevation view of the present pet grooming device.

Also included on the brush base 12 is a plurality of bristles 26 as shown in FIGS. 1, 2 and 7. The preferably pointed bristles 26 project normally from the first surface 14, and are located around the perimeter of the brush base 12. Further, the bristles 26 are grouped together into quadrants 30a, 30b, 30c, 30d positioned on each side of the rectangular shaped base 12. It is contemplated that the bristles 26 are provided in various lengths with longer or taller bristles closer to the exterior or peripheral edge 18. Preferably, the bristles 26 on the outside of each quadrant 30a, 30b, 30c, 30d (those closer to the peripheral edge 18) are approximately 0.750 inches tall and the bristles on the inside of each quadrant are approximately 0.625 inches tall. Other lengths for the bristles 26 are also suitable depending on the application. By placing the bristles 26 along the perimeter of the brush base 12, the grooming device 10 maintains contact with pet fur or coat regardless of whether the device is moved vertically or horizontally in grooming strokes. Therefore, pets of different sizes, and especially hard to reach areas of the pets, can be cleaned more effectively than with conventional devices.

Referring now to FIGS. 1-4, each grooming device 10 also has a biased platform 32 attached to the first surface 14 of the brush base 12. The biased platform 32 is generally rectangular and includes an outer surface 34 and an inner surface 36 facing the brush base 12 first surface 14. Moreover, the biased platform 32 is preferably made of hard rubber or plastic material.

Included in the biased platform 32 is at least one, and preferably a pair of platform latches 38. The platform latches 38 may vary in number and arrangement to suit the situation. As should be appreciated, the number of platform latches 38 should correspond to the number of brush base latches 20. In the preferred embodiment, the platform latch 38 includes a generally rectangular hollow chamber 39, and is configured for matingly receiving and interlocking with the brush base latch 20.

Figure 3:
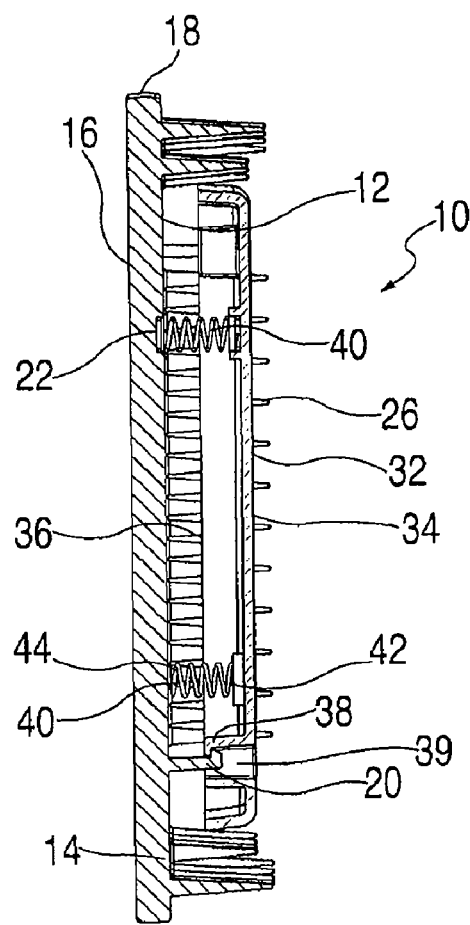
FIG. 3 is a cross-section of the present pet grooming device taken along the line 3-3 of FIG. 5 and in the direction generally indicated.
Figure 4:
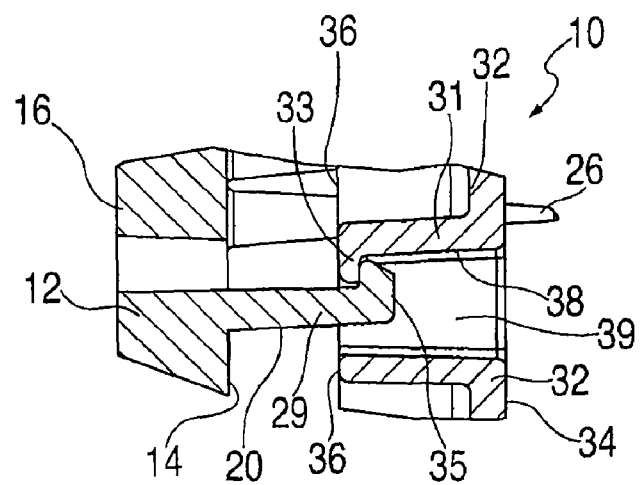
FIG. 4 is an enlarged partial section of the device depicted in FIG. 3.

Referring now to FIGS. 3-4, the position of each brush base latch 20 is respectively aligned with its associated platform latch 38 when the center portion 32 is coupled to the brush base 12. Each latch 20, 38 has a locating aid 29, 31 and a hook 33, 35. As shown in FIG. 4, the corresponding hooks 33, 35 engage each other when the platform 32 engages the base 12.

Figure 9:
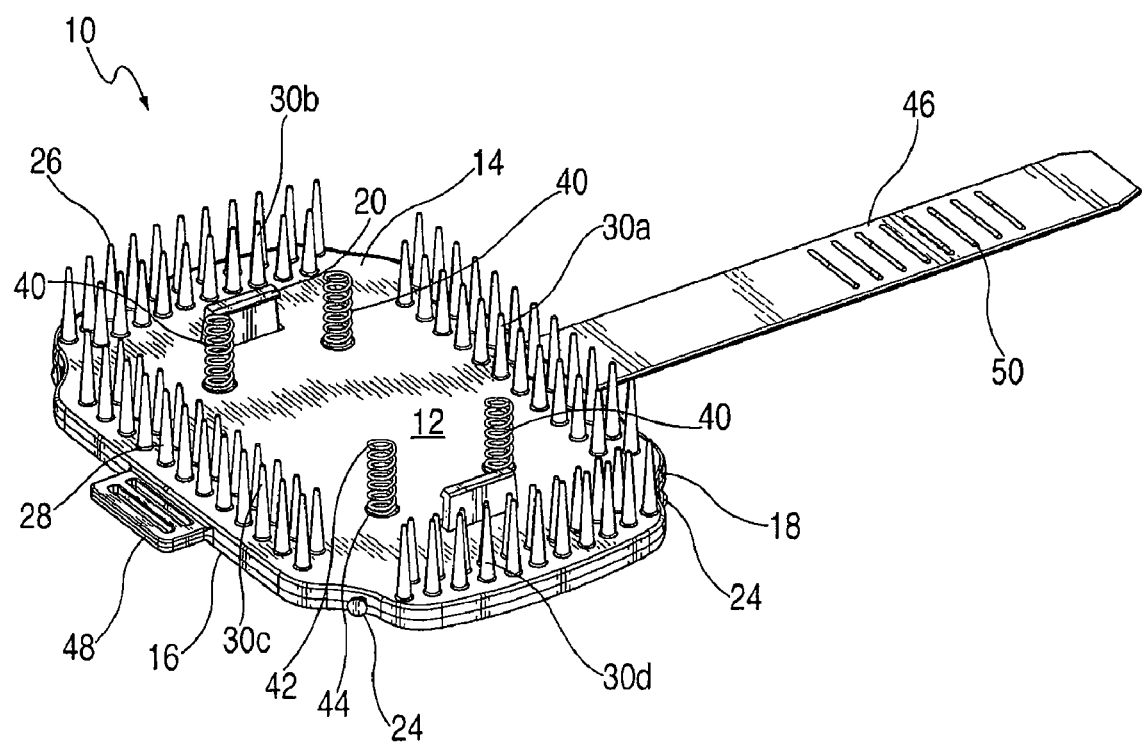
FIG. 9 is a fragmentary top perspective view of the preset grooming device without the biased platform.

Mounted into the biased platform first surface 34 are a plurality of springs 40, as shown in FIGS. 2, 3, and 9. In this embodiment, there are four preferably coiled springs 40, each located approximately in each corner of the biased platform 32 and oriented normally relative to the base 12. The placement and number of springs 40, as well as the type of springs used, may vary based on the level of flexibility desired. Separate metal or plastic springs, and integral plastic springs are also contemplated.

Each spring 40 includes a first end 42 and a second end 44. The first end 42 of each spring 40 is mounted into the first surface 34 of the biased platform 32. The second end 44 of each spring 40 is seated in a corresponding spring pocket 22 located on the first surface 14 of the brush base 12. Each spring pocket 22 is configured to receive the second spring end 44 such that once the second spring end is engaged in the spring pocket, the spring is securely fastened to the brush base 12. In an alternate configuration, each spring pocket 22 may be positioned on the biased platform 32 and each spring 40 may be attached to the brush base 12. The location of each spring 40 on the biased platform 32 corresponds to a spring pocket 22 on the first surface 14 of the brush base 12. As can be seen in FIGS. 2-3, the position of each spring 40 is respectively aligned with its associated spring pocket 22 when the biased platform 32 is latched with the brush base 12.

Turning now to FIGS. 1 and 4, upon assembly, it can be seen that the biased platform latch 38 is interlocked with the brush base latch 20 so that the biased platform 32 clips into place. Once interlocked, the biased platform 32 is secured to the brush base 12. Movement of the platform 32 relative to the base 12 is accommodated by the biasing action of the springs 40 and the length of the latches 38 and 20. The platform latch 38 and chamber 39 are dimensioned to accommodate relative movement of the base 12 via the latch 20 when the platform 32 is pressed against the base 12, temporarily overcoming the biasing force of the springs 40. As such, the platform latch 38 and base latch 20 configuration permits adjustment of the biased platform 32 position relative to the base 12 as it is maneuvered over the contours of the pet's coat. It is further contemplated that once the biased platform 32 is secured to the brush base 12, the biased platform can be removed for cleaning. Removal of the biased platform 32 may require the use of an additional tool, such as a screwdriver, for disconnecting the brush base latch 20 and the biased platform latch 38.

Also featured with the present grooming device 10 is an adjustable strap assembly 46 for attaching the device to a user's hand. Included with the strap assembly 46 is a receiving portion or buckle 48 and a strap portion 50. Both the strap portion 50 and the receiving portion 48 are preferably molded or otherwise fixed into the brush base 12 and are configured so that the strap portion connects with the receiving portion, as is known in the strap art. Once connected, the grooming device 10 is securable to a hand. The strap assembly 46 is made of flexible rubber or other suitable materials.

Figure 5:
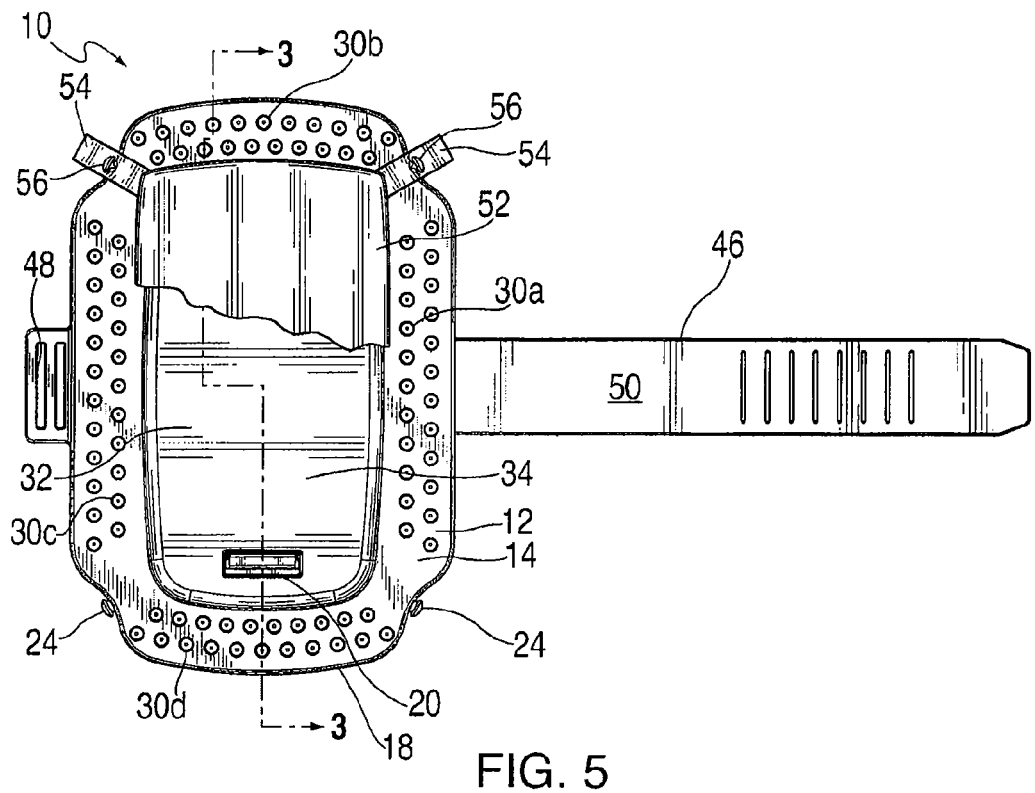
FIG. 5 is an overhead plan view of the present pet grooming device with a wipe attached.
Figure 8A:
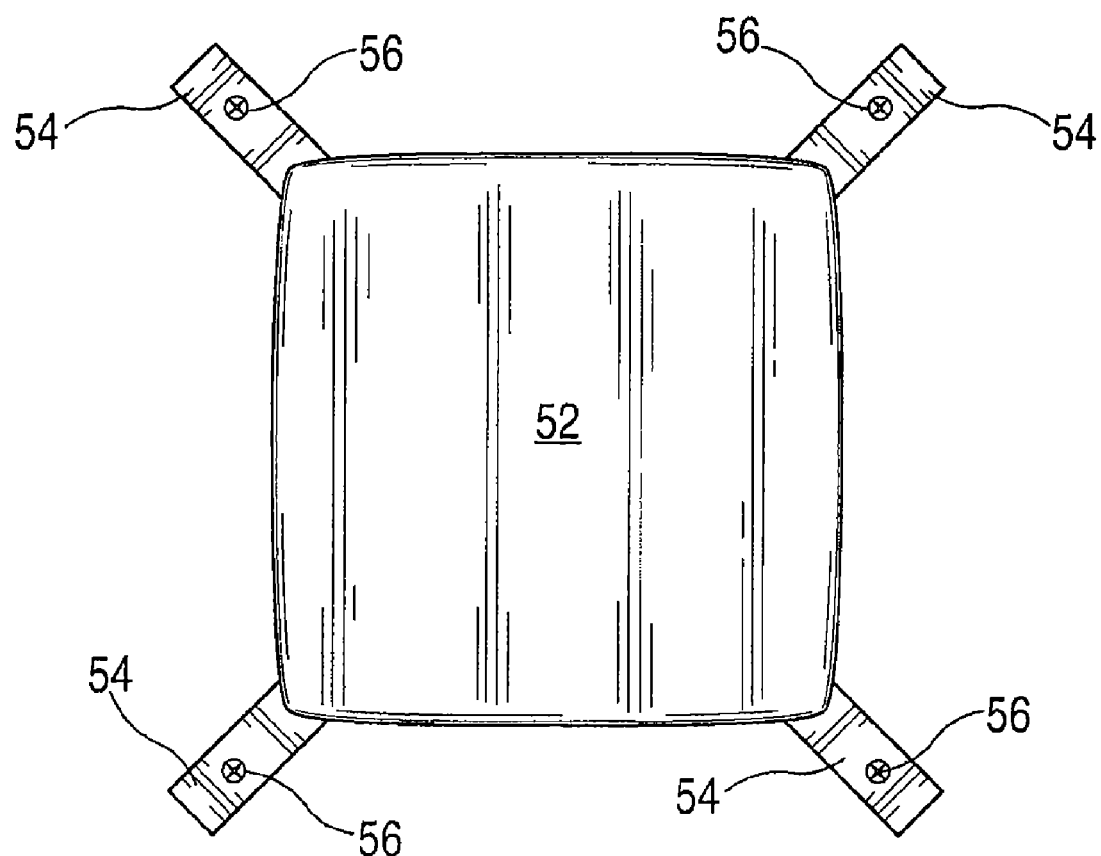
FIG. 8A is a top view of the wipe of the present pet grooming device.
Figure 8B:
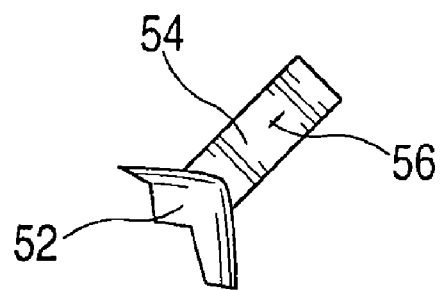
FIG. 8B is a top view of the tab associated with the wipe in FIG. 8A.

Turning now to FIGS. 5 and 8, the present grooming device also includes a disposable wiping cloth, wipe or pad 52. In this embodiment, the wipe 52 is generally rectangular. However, since the wipe 52 is configured to fit the shape of the biased platform 32, other configurations are contemplated, depending on the shape of the biased platform. Each wipe 52 includes an integrated plurality of tabs 54 for securing the wipe to the grooming device 10. In the preferred embodiment, the wipe 52 is configured with four tabs 54 extending outwardly from the wipe and over each corner of the biased platform 32. Each tab 54 has an opening 56 for securing the tab 54 to the button 24 located on the side surface 18 of the brush base 12. Preferably, the opening 56 is either an "X" cutout or small hole. Other configurations for the opening 56, such as a slit, are also suitable.

The technique for attaching the tab 54 to the button 24 will vary depending on the configuration of the opening 56. In most cases, the wipe 52 is fastened to the button 24 by being extended over the button 24 where the opening will fit over the button. Once attached, the wipe 52 is securely fastened so that it will withstand pressure from the movement of the pet grooming device 10.

The wipe 52 is made of a durable fabric that can hold or be saturated with a large amount of embedded liquid. Preferably, the wipe 52 is made with all natural ingredients to limit allergic reactions of the pet. The present pet grooming device 10 preferably include at least three different types of disposable wipes 52. One wipe 52 is used to clean the pet and has a disinfectant to remove bacteria such as *Escherichia coli* (*E. coli*). This wipe 52 will also remove allergens as well as odor causing particles.

A second wipe 52 is available to deodorize pets. This wipe 52 includes a deodorizer and/or a fragrance such as "clean pet" smell. Finally, a third wipe 52 has coat conditioner to put shine into the pet's hair. This wipe 52 will provide moisture and shine so that it leaves the pet's hair or fur looking healthy and flake free. Other types of wipes 52 are also suitable based on desired application such as conditioning, moisturizing, gentle/mild cleansers, tearless, hypoallergenic and neutral pH.

An important feature of the present pet grooming device 10 is the flexibility of the biased platform 32 as it moves over the contours of the pet hair. This flexibility enables the biased platform 32 to automatically adjust for all lengths and textures of hair. As pressure is applied while the device 10 skims across the hair, the plurality of springs 40 and dimensioned chamber 39 enable the biased platform 32 to adjust vertically relative to the base 12 so the grooming device 10 is able to brush through long or short hair. While stroking across the natural growth of the hair, the bristles 26 lift and separate the hairs while the wipe 52 cleans them.

Further, the pet grooming device 10 can be packaged as an assembly which may include a carrying case (not illustrated) such that the grooming device 10 and the wipes 52 can be stored together. The assembly may also include a refill package of wipes 52.

Referring now to FIGS. 10-14, an additional embodiment of the pet grooming device 10 is generally designated as 100. Components of the embodiment 100 shared with the device 10 are designated using the same reference number. A main distinguishing feature of the device 100 is that the brush base 12 includes at least one latch 102 that extends generally perpendicularly from the first surface 14. In this configuration, four latches 102 are included. The latches 102 are preferably integral to the brush base 12, for example, by injection molding, attachment by chemical adhesive, or the like, and may vary in number and arrangement based on design preference. In this embodiment, the base latch 102 is tubular and defines a chamber 103 with an inwardly projecting peripheral hook 104, and is configured for matingly receiving and interlocking with a tubular platform latch 105.

Figure 12:
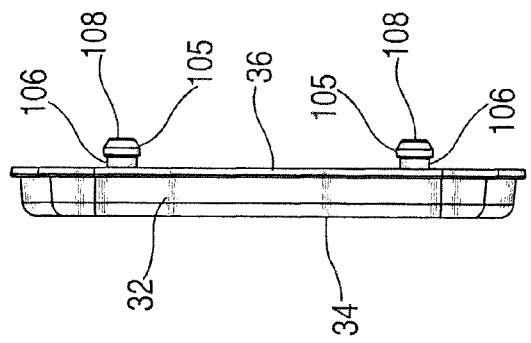
FIG. 12 is a side elevation view of the biased platform of the embodiment of FIG. 10.
Figure 13:
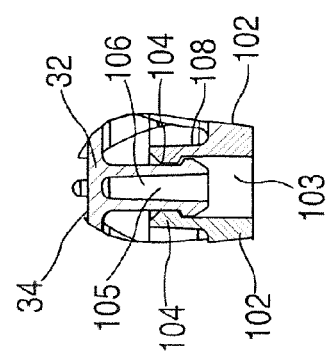
FIG. 13 is a vertical fragmentary cross-section of the latching mechanism of the embodiment of FIG. 10.

As best shown in FIGS. 12-13, the biased platform 32 includes at least one, and preferably four platform latches 105 positioned on the inner surface 36. The platform latches 105 may vary in number and arrangement to suit the situation. As should be appreciated, the number of platform latches 105 preferably corresponds to the number of brush base latches 102. In the device 100, the platform latch 105 is oriented normally relative to the base 12 and includes a tubular stem portion 106 with a smaller diameter than the latch 102 and a peripherally outwardly projecting lip 108 that is configured for matingly interlocking with the brush base latch 102. Preferably, each latch 108 is located approximately in each corner of the base 12.

Mounted into the biased platform first surface 34 are a plurality of springs 110, as shown in FIG. 11. In the device 100, there are four preferably plastic molded springs 110 integral to the base 12, each located approximately in each quadrant of the base and oriented normally relative to the base. The springs 110 are hollow and conical in shape and have relatively thin walls providing biasing force. The placement, configuration and number of springs 110 in the device may vary based on the level of flexibility desired.

Figure 14:
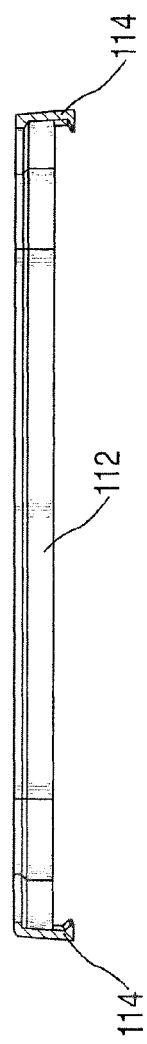
FIG. 14 is vertical cross-section of a retaining ring in the embodiment of FIG. 10.

Referring now to FIGS. 11 and 14, the device 100 also includes a ring 112 for securing the wipe 52 to the biased platform 32. The ring 112 is sized to be positioned around a perimeter of the platform 32 and includes at least one latch 114. Additionally, the platform 32 includes at least one indented section 116 for receiving the latch 114. Preferably, the ring 112 includes a pair of latches 114 and the biased platform 32 includes a corresponding pair of indented sections 116. After the wipe 52 is placed onto the platform 32, the ring 112 is placed over the platform and the latches 114 are attached to the corresponding indented sections 116. Once attached, the wipe 52 is securely fastened so that it will withstand pressure from the movement of the pet grooming device 10. In this embodiment, the wipe 52 should be configured to fit the shape of the biased platform 32 so that at least a portion of the wipe is positioned in between the ring 112 and platform when the ring 112 is locked to the platform.

Upon assembly, it can be seen that the biased platform latch 105 is interlocked with the brush base latch 102 so that the biased platform 32 clips into place. Once interlocked, the biased platform 32 is secured to the brush base 12 by the hook 104 which functions to maintain the head 108 inside the base latch 102. Movement of the platform 32 relative to the base 12 is accommodated by the biasing action of the springs 110 and the length of the latches 102 and 105. As best shown in FIG. 13, the base latch chamber 103 is dimensioned to accommodate relative movement of the platform 32 via the latch 105 when the platform is pressed against the base 12, temporarily overcoming the biasing force of the springs 110. As such, the platform latch 105 and base latch 102 configuration permits adjustment of the biased platform 32 position relative to the base 12 as it is maneuvered over the contours of the pet's coat.

While a particular embodiment of the present pet grooming device has been shown and described, it will be appreciated by those skilled in the art that changes and modifications may be made thereto without departing from the invention in its broader aspects and as set forth above.

What is claimed:

1. A pet grooming device comprising:
   a brush base including a plurality of bristles located around a perimeter of said brush base and at least one base latch for securing a biased platform;
   said biased platform having at least one platform latch for securing said biased platform to said brush base by interconnecting the brush base latch with the biased platform latch; and
   said brush base further comprising a wipe, wherein said wipe is attached to an outer surface of said biased platform and said wipe is surrounded by said plurality of bristles for accessing said wipe independent of said bristles and said wipe is not in contact with said plurality of bristles.

2. The pet grooming device of claim 1 further including at least one spring positioned between said biased platform and said brush base.

3. The pet grooming device of claim 1 wherein said plurality of bristles on an outside of the quadrant are longer than the bristles on an inside of the quadrant.

4. The pet grooming device of claim 1 wherein said biased platform is made of one of rubber and hard plastic.

5. The pet grooming device of claim 1 wherein said biased platform and said brush base each include a plurality of corresponding latches for securing said biased platform to said brush base.

6. The pet grooming device of claim 1 wherein each latch includes a wedge and a hook wherein the corresponding hooks engage each other.

7. The pet grooming device of claim 1 further comprising a strap and a strap receiver integrally connected to said brush base.

8. A pet grooming device comprising:
a brush base having a first surface, a second surface, a plurality of bristles projecting from the first surface, a plurality of springs projecting from the first surface and at least one base latch for securing a biased platform;
said biased platform having an outer surface and an inner surface, and at least one platform latch, said biased platform being attached to said brush base first surface by interconnecting the at least one brush base latch with the at least one biased platform latch;
a wipe positioned on said biased platform outer surface; and
a ring attached to said biased platform for clamping said wipe on said biased platform, said wipe being positioned between said ring and said biased platform and being accessible within a space defined by said plurality of bristles.

9. A pet grooming device comprising:
a brush base including a plurality of bristles and at least one base latch for securing a biased platform;
said biased platform having at least one platform latch for securing said biased platform to said brush base by interconnecting the brush base latch with the biased platform latch;
said brush base further comprising a wipe, wherein said wipe is attached to an outer surface of said biased platform using a removable ring attached to said biased platform, said wipe being positioned between said ring and said biased platform wherein said plurality of bristles are located around a perimeter of said brush base and said wipe is surrounded by said plurality of bristles for accessing said wipe independent of said bristles and said wipe is not in contact with said plurality of bristles.

* * * * *